United States Patent
Martinez et al.

(10) Patent No.: US 7,041,775 B2
(45) Date of Patent: May 9, 2006

(54) METHOD FOR PREPARING A POLYCARBONATE OLIGOMER MIXTURE AT LOW TEMPERATURE FOR MANUFACTURING POLYCARBONATE

(75) Inventors: Maria Tomas Martinez, Murcia (ES); Alberto Nisoli, Niskayuna, NY (US); Alfredo Lopez Carretero, Alberca Murcia (ES); Ganesh Kailasam, Evansville, IN (US); David Domingo, Murcia (ES); Patrick Joseph McCloskey, Watervliet, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/830,163

(22) Filed: Apr. 21, 2004

(65) Prior Publication Data

US 2005/0234211 A1   Oct. 20, 2005

Related U.S. Application Data

(60) Provisional application No. 60/521,410, filed on Apr. 20, 2004.

(51) Int. Cl.
*C08G 64/00* (2006.01)

(52) U.S. Cl. .................. 528/196; 264/176.1; 264/219; 422/131; 422/135; 528/198

(58) Field of Classification Search ............ 264/176.1, 264/219; 422/131, 135; 528/196, 198
See application file for complete search history.

(56) References Cited

U.S. PATENT DOCUMENTS

| | | | |
|---|---|---|---|
| 4,323,668 A | 4/1982 | Brunelle | |
| 5,091,591 A | 2/1992 | Cipullo | |
| 5,151,491 A | 9/1992 | Sakashita et al. | |
| 5,276,129 A | 1/1994 | Sakashita et al. | |
| 5,525,701 A | 6/1996 | Tominari et al. | |
| 5,696,222 A | 12/1997 | Kaneko et al. | |
| 6,177,536 B1 | 1/2001 | Anamizu et al. | |
| 6,252,036 B1 | 6/2001 | Hatono et al. | |
| 6,300,459 B1 | 10/2001 | Kaneko et al. | |
| 6,303,734 B1 | 10/2001 | Funakoshi et al. | |
| 6,399,739 B1 | 6/2002 | McCloskey et al. | |
| 6,403,754 B1 | 6/2002 | McCloskey et al. | |
| 6,410,777 B1 | 6/2002 | Kaneko et al. | |
| 6,417,291 B1 | 7/2002 | Kaneko et al. | |
| 6,420,512 B1 | 7/2002 | McCloskey et al. | |
| 6,420,588 B1 | 7/2002 | McCloskey et al. | |
| 6,469,192 B1 | 10/2002 | Burnell et al. | |
| 6,500,914 B1 | 12/2002 | Brack et al. | |
| 6,506,871 B1 | 1/2003 | Silvi et al. | |
| 6,518,391 B1 | 2/2003 | McCloskey et al. | |
| 6,525,163 B1 | 2/2003 | Brack et al. | |
| 6,548,623 B1 | 4/2003 | Brunelle et al. | |
| 6,590,068 B1 | 7/2003 | Brack et al. | |
| 6,600,004 B1 | 7/2003 | McCloskey et al. | |
| 6,653,434 B1 | 11/2003 | Brack et al. | |
| 6,706,846 B1 | 3/2004 | Brack et al. | |
| 6,710,156 B1 | 3/2004 | Whitney et al. | |
| 6,723,823 B1 | 4/2004 | McCloskey et al. | |
| 6,734,277 B1 | 5/2004 | Brack et al. | |
| 6,747,119 B1 | 6/2004 | Brack et al. | |
| 2002/0132957 A1 | 9/2002 | Brack et al. | |
| 2003/0050427 A1 | 3/2003 | Brunelle et al. | |
| 2003/0232957 A1* | 12/2003 | Silvi et al. | .............. 528/86 |
| 2004/0068086 A1 | 4/2004 | Day et al. | |
| 2004/0087756 A1 | 5/2004 | Ramesh et al. | |

FOREIGN PATENT DOCUMENTS

| | | |
|---|---|---|
| DE | 24 39 552 | 2/1976 |
| JP | 5009282 A2 | 1/1993 |
| JP | 10-101786 A2 | 4/1998 |
| JP | 10-101787 A2 | 4/1998 |
| JP | 11-302228 | 11/1999 |
| JP | 2002-309015 A2 | 10/2002 |
| WO | WO 03/040208 A1 | 5/2003 |
| WO | WO 03/106149 A1 | 12/2003 |

* cited by examiner

*Primary Examiner*—Terressa Boykin
(74) *Attorney, Agent, or Firm*—Marina Larson & Associates, LLC (57) ABSTRACT

The present invention provides a method of making polycarbonate oligomers, polycarbonate, molded articles formed from polycarbonate, and an apparatus for making polycarbonate. An oligomer mixture is first prepared by the steps of providing an equilibration system comprising a vessel, a reaction mixture contained within the vessel, and means for mixing the reaction mixture contained within the vessel wherein the reaction mixture comprises a melted activated diaryl carbonate composition, and a catalyst present in sufficient amount to initiate an oligomerization reaction between a dihydroxy composition and the activated diaryl carbonate to form polycarbonate oligomers. The method further includes the steps of introducing a melted dihydroxy composition to the reaction mixture contained within the equilibration system, maintaining the reaction mixture contained within the vessel at an oligomerization temperature, said oligomerization temperature being below the melting point the dihydroxy composition, and sufficiently high to allow formation of a homogeneous melt within the vessel, and continuously drawing off a product stream from the equilibration system, wherein the product stream comprises a polycarbonate oligomer mixture. This polycarbonate oligomer mixture is suitably used as a feed stock for producing polycarbonate in a polycondensation system. The polycarbonate is suitably used for the preparation of molded articles.

61 Claims, 1 Drawing Sheet

FIG. 1

METHOD FOR PREPARING A
POLYCARBONATE OLIGOMER MIXTURE
AT LOW TEMPERATURE FOR
MANUFACTURING POLYCARBONATE

CROSS REFERENCE TO RELATED APPLICATIONS

This application claims the benefit of U.S. provisional application No. 60/521,410 filed on Apr. 20, 2004.

BACKGROUND OF THE INVENTION

Polycarbonate is a thermoplastic that has excellent mechanical properties such as impact resistance, heat resistance and transparency. Polycarbonate is widely used in many engineering applications.

Polycarbonates may be prepared by several processes (U.S. Pat. No. 6,177,536) including: i) Interfacial, wherein a multiphase reaction process a dihydroxy aromatic compound is first reacted with phosgene in the presence of a small amount of monohydroxy aromatic compound and then precipitated and dried to yield a polycarbonate powder; ii) A melt process in which phosgene is reacted with a monohydroxy aromatic compound in the presence of an alkaline catalyst to yield a carbonic diester that is polymerized in a multistage reactor in the presence of a dihydroxy aromatic compound to yield a molten polycarbonate; iii) A melt process in which a non phosgene route is used to obtain a carbonic diester that is polymerized in a multistage reactor in the presence of a dihydroxy aromatic compound to yield a molten polycarbonate (U.S. Pat. No. 5,525,701); and iv) A melt process in which a phosgene route is used to obtain an ester substituted diaryl carbonate that is polymerized in a multistage reactor in the presence of a dihydroxy aromatic compound to yield a molten polycarbonate (U.S. Pat. No. 4,323,668).

U.S. Pat. No. 4,323,668 describes a reaction between BPA and BMSC to produce BPA homopolymer polymers. The patent states that use of (ortho-alkoxycarbonylaryl) carbonate substrates provides—when contrasted with bis(ortho-haloaryl)carbonates—the following advantages: (1) improved transesterification reaction rate, (2) less polycarbonate color formation during the transesterification reaction, (3) milder transesterification reaction conditions including lower temperatures, (4) reduced amounts of carbonate substrate since only stoichiometric amounts or amounts slightly in excess are required for complete conversion of all dihydric phenol to polycarbonate, and (5) reduced or equivalent quantities of catalyst at improved reaction rate, temperature and pressure transesterification reaction conditions.

SUMMARY OF THE INVENTION

Applicants have determined that polycarbonate oligomers may be formed in an equilibration system at low temperature prior to being introduced to a polycondensation system. Thus, the present invention provides a method of preparing a polycarbonate oligomer mixture. In one embodiment the method comprises the steps of:

(a) providing an equilibration system comprising a vessel, a reaction mixture contained within the vessel, and means for mixing the reaction mixture contained within the vessel wherein the reaction mixture comprises,
 i. a melted activated diaryl carbonate composition, and
 ii. a catalyst present in sufficient amount to initiate an oligomerization reaction between a dihydroxy composition and the activated diaryl carbonate to form polycarbonate oligomers,
(b) introducing a melted dihydroxy composition to the reaction mixture contained within the equilibration system,
(c) maintaining the reaction mixture contained within the vessel at an oligomerization temperature, said oligomerization temperature being below the melting point of the dihydroxy composition, and sufficiently high to allow formation of a homogeneous melt within the vessel, and
(d) continuously drawing off a product stream from the equilibration system, wherein the product stream comprises a polycarbonate oligomer mixture.

The present invention is an improvement over the prior art. The polycarbonate oligomer stream produced by the method of this invention has the benefit of being produced in a continuous process. Further, the dihydroxy composition is melted prior to its combination with an activated diaryl carbonate composition and a catalyst. This step helps to ensure that random polymerization occurs in the event that the dihydroxy composition comprises more than one monomer residue. The melting occurs in a way to minimize degradation of the dihydroxy composition which results in a final polycarbonate with improved color as compared to a process where degradation of the monomer occurs during melting. Further, by producing an oligomeric mixture at temperatures below the melting point of the individual monomers and maintaining low residence times in the equilibration system, by-product formation is minimized.

DETAILED DESCRIPTION OF THE INVENTION

The present invention may be understood more readily by reference to the following detailed description of preferred embodiments of the invention and the examples included therein.

The present invention provides a method of manufacturing a polycarbonate oligomer mixture comprising the steps of:

(a) providing an equilibration system comprising a vessel, a reaction mixture contained within the vessel, and means for mixing the reaction mixture contained within the vessel wherein the reaction mixture comprises,
 i. a melted activated diaryl carbonate composition, and
 ii. a catalyst present in sufficient amount to initiate an oligomerization reaction between a dihydroxy composition and the activated diaryl carbonate to form polycarbonate oligomers,
(b) introducing a melted dihydroxy composition to the reaction mixture contained within the equilibration system,
(c) maintaining the reaction mixture contained within the vessel at an oligomerization temperature, said oligomerization temperature being below the melting point of the dihydroxy composition, and sufficiently high to allow formation of a homogeneous melt within the vessel, and (d) continuously drawing off a product stream from the equilibration system, wherein the product stream comprises a polycarbonate oligomer mixture.

This polycarbonate oligomer mixture can then be used as a feed material in the production of polycarbonate of higher molecular weight.

In the specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

"Polycarbonate" refers to polycarbonates incorporating repeat units derived from at least one dihydroxy aromatic compound and includes copolyestercarbonates, for example a polycarbonate comprising repeat units derived from resorcinol, bisphenol A, and dodecandioic acid. Nothing in the description and claims of this application should be taken as limiting the polycarbonate to only one dihydroxy residue unless the context is expressly limiting. Thus, the application encompasses copolycarbonates with residues of 2, 3, 4, or more types of dihydroxy compounds.

"Oligomer" refers to polycarbonate polymers having from 2 to 40 repeat units derived from dihydroxy compound (s).

"Polycarbonate oligomer mixture" refers to a "product stream" of polycarbonate oligomers drawn from the equilibration system. The polycarbonate oligomer mixture is suitably used as a feedstock to a polymerization system wherein polymer weight is increased thereby forming polycarbonate.

"Equilibration system" refers to the area within the process wherein a polymerization reaction takes place between the dihydroxy compositions and the activated diaryl carbonate compositions. This reaction may take place either in a continuous mode and in one vessel or in a series of vessels as herein defined. The equilibration system is not limited solely to one vessel.

"Reaction mixture" refers to a mixture contained within the equilibration system. The reaction mixture comprises a melted activated diaryl carbonate composition and a catalyst system.

"Catalyst system" or "catalyst" as used herein refers to a catalyst or catalysts that catalyze the transesterification of a dihydroxy compound with a diarylcarbonate in the preparation of melt polycarbonate.

"Polycondensation system" refers to the area within the process wherein the monomers and oligomers react and where polycarbonate weight is built. This may occur within, among other places, extruders, equilibration vessels, continuously stirred tank reactors, batch reactors, packed bed reactors, vertical reactors, horizontal reactors, or heat exchangers.

"Dihydroxy aromatic compound(s)" means an aromatic compound which comprises two hydroxy groups on one or more aromatic rings, for example a bisphenol such as bisphenol A or a dihydroxy benzene such as resorcinol.

"Dihydroxy compound(s)" are not limited to dihydroxy aromatic compound(s).

"BPA" is herein defined as bisphenol A or 2,2-bis(4-hydroxyphenyl)propane.

"Aromatic radical" refers to a radical having a valence of at least one comprising at least one aromatic group. Examples of aromatic radicals include phenyl, pyridyl, furanyl, thienyl, naphthyl, phenylene, and biphenyl. The term includes groups containing both aromatic and aliphatic components, for example a benzyl group.

"Cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclopropyl, cyclopentyl, cyclohexyl, tetrahydrofuranyl and the like.

"Continuously" means constant addition or drawing off, at a constant or variable flow rate, or pulsed addition or drawing off, with the provision that the total "off time," the time that no flow to or from the system is occurring, does not exceed the "on time," when flow is occurring. In calculating the "on-time" and "off-time" only the time is taken into account during which changes occur to the equilibration system. Changes include chemical changes (i.e. reaction), feeding or emptying the equilibration system. The time the reaction mixture is at equilibrium after preparation of the oligomer mixture product and before drawing off the oligomer mixture product is not taken into account. Preferably the "on-time" and the "off-time" will each be divided into intervals of substantially equal length through the process cycle.

"Vessel" means any type of tank, receptacle, reactor, bed, or combinations thereof. More generally, the term "vessel" as used in this application refers to the area wherein the dihydroxy composition and the activated diaryl carbonate composition react to form polycarbonate oligomers.

"Separate feeds" means that any mixing of the dihydroxy compound and the diaryl carbonate composition occurs within the equilibration vessel, or immediately prior to the introduction to the equilibration vessel such that substantially no reaction (for example less than 10%) between the dihydroxy compounds and the diaryl carbonate occurs. Similarly catalysts are added to the equilibration vessel via a separate feed.

Numerical values in the specification and claims of this application, particularly as they relate to polymer compositions, reflect average values for a composition that may contain individual polymers of different characteristics. Furthermore, the numerical values should be understood to include numerical values which are the same when reduced to the same number of significant figures and numerical values which differ from the stated value by less than the experimental error of the measurement technique used in the present application to determine the value.

The Dihydroxy Compound:

The dihydroxy compound is preferably introduced to the equilibration vessel in a melted state. The dihydroxy compound is not limited to aromatic dihydroxy compounds. However, such dihydroxy aromatic compounds are frequently preferred for use in these types of applications. It is contemplated that the dihydroxy compound comprises aliphatic diols and/or acids. The following is a non limiting list of such compounds:

Aliphatic Diols:
Isosorbide: 1,4:3,6-dianhydro-D-sorbitol, Tricyclodecane-dimethanol (TCDDM), 4,8-Bis(hydroxymethyl)tricyclodecane, Tetramethylcyclobutanediol (TMCBD), 2,2,4,4,-tetramethylcyclobutane-1,3-diol, mixed isomers, cis/trans-1,4-Cyclohexanedimethanol (CHDM), cis/trans-1,4-Bis (hydroxymethyl)cyclohexane, cyclohex-1,4-ylenedimethanol, trans-1,4-Cyclohexanedimethanol (tCHDM), trans-1,4-Bis(hydroxymethyl)cyclohexane, cis-1, 4-Cyclohexanedimethanol (cCHDM), cis-1,4-Bis(hydroxymethyl)cyclohexane, cis-1,2,-cyclohexanedimethanol, 1,1'-bi(cyclohexyl)-4,4'-diol, dicylcohexyl-4,4'-diol, 4,4'-dihydroxybicyclohexyl, and Poly(ethylene glycol).

Acids:

1,10-Dodecanedioic acid (DDDA), Adipic acid, Hexanedioic acid, Isophthalic acid, 1,3-Benzenedicarboxylic acid, Teraphthalic acid, 1,4-Benzenedicarboxylic acid, 2,6-Naphthalenedicarboxylic acid, 3-hydroxybenzoic acid (mHBA), and 4-hydroxybenzoic acid (pHBA).

It is further contemplated that the dihydroxy composition comprise a dihydroxy aromatic compound. A preferred dihydroxy aromatic composition of the present invention is bisphenol A (BPA). However, other dihydroxy aromatic compounds of the present invention can be used and are selected from the group consisting of bisphenols having structure I,

I wherein $R^3$—$R^{10}$ are independently a hydrogen atom, halogen atom, nitro group, cyano group, $C_1$–$C_{20}$ alkyl radical, $C_4$–$C_{20}$ cycloalkyl radical, or $C_6$–$C_{20}$ C aryl radical; W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical, or the group wherein $R^{11}$ and $R^{12}$ are independently a hydrogen atom, $C_1$–$C_{20}$ alkyl radical, $C_4$–$C_{20}$ cycloalkyl radical, or $C_4$–$C_{20}$ aryl radical; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$, aralkyl, $C_5$–$C_{20}$ cycloalkyl groups, or a combination thereof; dihydroxy benzenes having structure II

II wherein $R^{15}$ is independently at each occurrence a hydrogen atom, halogen atom, nitro group, cyano group, $C_1$–$C_{20}$ alkyl radical, $C_4$–$C_{20}$ cycloalkyl radical, or $C_4$–$C_{20}$ aryl radical, d is an integer from 0 to 4; and dihydroxy naphthalenes having structures III and IV

III

IV wherein $R^{16}$, $R^{17}$, $R^{18}$ and $R^{19}$ are independently at each occurrence a hydrogen atom, halogen atom, nitro group, cyano group, $C_1$–$C_{20}$ alkyl radical, $C_4$–$C_{20}$ cycloalkyl radical, or $C_4$–$C_{20}$ aryl radical; e and f are integers from 0 to 3, g is an integer from 0 to 4, and h is an integer from 0 to 2.

Suitable bisphenols I are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis (4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)-propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3, 5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4- hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene and 1,4-bis(2-(4-hydroxy-3-methylphenyl)-2-propyl)benzene.

Suitable dihydroxy benzenes II are illustrated by hydroquinone, resorcinol, methylhydroquinone, butylhydroquinone, phenylhydroquinone, 4-phenylresorcinol and 4-methylresorcinol.

Suitable dihydroxy naphthalenes III are illustrated by 2,6-dihydroxy naphthalene; 2,6-dihydroxy-3-methyl naphthalene; and 2,6-dihydroxy-3-phenyl naphthalene.

Suitable dihydroxy naphthalenes IV are illustrated by 1,4-dihydroxy naphthalene; 1,4-dihydroxy-2-methyl naphthalene; 1,4-dihydroxy-2-phenyl naphthalene and 1,3-dihydroxy naphthalene.

The relative amounts of BPA and other comonomers are selected based on the desired composition of the oligomers. If other comonomers are used, they can be added as part of the same feed, in a separate feed, or both.

The Activated Diaryl Carbonate:

The carbonate is preferably derived from an activated dicarbonate or a mixture of an activated carbonate with diphenyl carbonate. A preferred activated carbonate of the present invention is an activated diarylcarbonate such as bismethylsalicylcarbonate (BMSC). However, as used herein the term "activated carbonate" is defined as a diarylcarbonate which is more reactive than diphenylcarbonate toward transesterification reactions. Such activated carbonates are of the general formula:

wherein Ar is a substituted aromatic radical having 6 to 30 carbon atoms. The preferred activated carbonates have the more specific general formula:

wherein Q and Q' are each independently activating groups. A and A' are each independently aromatic rings which can be the same or different depending on the number and location of their substituent groups, and n or n' are whole numbers of zero up to a maximum equivalent to the number of replaceable hydrogen groups substituted on the aromatic rings A and A', wherein n+n' is greater than or equal to 1. R and R' are each independently substituent groups such as alkyl, substituted alkyl, cycloalkyl, alkoxy, aryl, alkylaryl, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A minus the number n'. The number, type, and location of the R and R' substituents on the aromatic ring are not limited unless they deactivate the carbonate and lead to a carbonate which is less reactive than diphenylcarbonate.

Non-limiting examples of activating groups Q and Q' are: alkoxycarbonyl groups, halogens, nitro groups, amide groups, sulfone groups, sulfoxide groups, or imine groups with structures indicated below:

Y = C, N, S, SO
Z = O, N
M = N — Dialkyl, Alkyl, Aryl, Aryloxy, Alkoxy
R1 = Alkyl or Aryl Specific and non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl) carbonate, bis(o-formylphenyl)carbonate. Unsymmetrical combinations of these structures, where the substitution number and type on A and A' are different, are also possible to employ in the current invention. A preferred structure for an activated carbonate is an ester-substituted diarylcarbonate having the structure:

wherein $R^1$ is independently at each occurrence a $C_1$–$C_{20}$ alkyl radical, $C_4$–$C_{20}$ cycloalkyl radical, or $C_4$–$C_{20}$ aromatic radical; $R^2$ is independently at each occurrence a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, or $C_1$–$C_{20}$ acylamino radical; and b is independently at each occurrence an integer 0–4. At least one of the substituents $CO_2R^1$ is preferably attached in an ortho position relative to the carbonate group.

Examples of preferred ester-substituted diarylcarbonates include but are not limited to bis(methylsalicyl)carbonate (CAS Registry No. 82091-12-1), bis(ethyl salicyl)carbonate, bis(propyl salicyl) carbonate, bis(butylsalicyl) carbonate, bis(benzyl salicyl)carbonate, bis(methyl 4-chlorosalicyl)carbonate and the like. Typically BMSC is preferred for use in melt polycarbonate synthesis due to its lower molecular weight and higher vapor pressure.

One method for determining whether a certain diarylcarbonate is activated or is not activated is to carry out a model transesterification reaction between the certain diarylcarbonate with a phenol such as p-(1,1,3,3-tetramethyl)butylphenol. This phenol is preferred because it possesses only one reactive site, possesses a low of volatility and possesses a similar reactivity to bisphenol-A. The model transesterification reaction was carried out at temperatures above the melting points of the certain diarylcarbonate and p-(1,1,3,3-tetramethyl)butylphenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diarylcarbonate. And a preferred reaction temperature is 200° C. But the choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and affect the reactant molar balance. The determination of the equilibrium concentration of reactants is accomplished through reaction sampling during the course of the reaction and then analysis of the reaction mixture using a well-know detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant was determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diarylcarbonate which possesses a relative equilibrium constant ($K_{test}/K_{DPC}$) of greater than 1 is considered to possess a more favorable equilibrium than diphenylcarbonate and is an activated carbonate, whereas a diarylcarbonate which possesses an equilibrium constant of 1 or less is considered to possess the same or a less favorable equilibrium than diphenylcarbonate and is considered not to be activated. It is generally preferred to employ an activated carbonate with very high reactivity compared to diphenylcarbonate when conducting transesterification reactions. Preferred are activated carbonates with an equilibrium constant greater than at least 10 times that of diarylcarbonate.

Some non-limiting examples of non-activating groups which, when present in an ortho position relative to the carbonate group, would not be expected to result in activated carbonates are alkyl, cycolalkyl or cyano groups. Some specific and non-limiting examples of non-activated carbonates are bis(o-methylphenyl)carbonate, bis(p-cumylphenyl)carbonate, bis(p-(1,1,3,3-tetramethyl)butylphenyl)carbonate and bis(o-cyanophenyl)carbonate. Unsymmetrical combinations of these structures are also expected to result in non-activated carbonates.

Unsymmetrical diarylcarbonates wherein one aryl group is activated and one aryl is unactivated or de-activated would also be useful in this invention if the activating group renders the diaryl carbonate still more reactive than diphenyl carbonate.

The carbonate may also be derived from dicarboxylic acids, dicarboxylic acid esters, or dicarboxylic acid halides. Such constituent repeating units are typically polyester-polycarbonate units. Non-limiting examples of dicarboxylic acids include terephthalic acid, isophthalic acid, sebacic acid, decanedioic acid, dodecanedioic acid, etc. Non-limiting examples of dicarboxylic acid esters include diphenyl sebacate, diphenyl terephthalate, diphenyl isophthalate, diphenyl decanedioate, diphenyl dodecanedioate, etc. Non-limiting examples of dicarboxylic acid halides include terephthaloyl chloride, isophthaloyl chloride, sebacoyl chloride, decanedioyl chloride, dodecanedioyl chloride, etc. Such polyester-polycarbonate units may be present in proportions of up to 50 mole %, preferably not more than 30 mole %, in copolymerized polycarbonates in accordance with the present invention.

The theoretical stoichiometry of the reaction within the equilibration vessel requires a molar ratio of dihydroxy compound to diaryl carbonate composition of 1:1. However, in practicing the present invention the molar ratio in the equilibration vessel is suitably between 0.25:1 to 3:1, more preferably 1:0.95 to 1:1.05 and more preferably 1:0.98 to 1:1.02.

The Catalyst:

The catalyst may be introduced to the equilibration system continuously, or may be introduced batchwise and may occur before, during or after the introduction of the activated diaryl carbonate or the dihydroxy compound(s).

The catalyst used in the method of the present invention is a base, and preferably comprises at least one source of alkaline earth ions or alkali metal ions, and/or at least one quaternary ammonium compound, a quaternary phosphonium compound or a mixture thereof. The source of alkaline earth ions or alkali metal ions being used in an amount such that the amount of alkaline earth or alkali metal ions present in the reaction mixture is in a range between about $10^{-5}$ and about $10^{-8}$ moles alkaline earth or alkali metal ion per mole of dihydroxy compound employed.

The quaternary ammonium compound is selected from the group of organic ammonium compounds having structure VI, wherein $R^{20}$—$R^{23}$ are independently a $C_1$–$C_{20}$ alkyl radical, $C_4$–$C_{20}$ cycloalkyl radical, or a $C_4$–$C_{20}$ aryl radical; and $X^-$ is an organic or inorganic anion. In one embodiment of the present invention anion $X^-$ is selected from the group consisting of hydroxide, halide, carboxylate, sulfonate, sulfate, formate, carbonate, and bicarbonate.

Non-limiting examples of suitable organic ammonium compounds comprising structure VI are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is selected from the group of organic phosphonium compounds having structure VII, wherein $R^{24}$—$R^{27}$ are independently a $C^1$–$C^{20}$ alkyl radical, $C^4$–$C^{20}$ cycloalkyl radical, or a $C_4$–$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic phosphonium compounds comprising structure VII are illustrated by tetrabutyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where $X^-$ is a polyvalent anion such as carbonate or sulfate it is understood that the positive and negative charges in structures VI and VII are properly balanced. For example, where $R^{20}$—$R^{23}$ in structure VI are each methyl groups and $X^-$ is carbonate, it is understood that $X^-$ represents ½ $(CO_3^{-2})$.

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt. Sodium hydroxide is often preferred.

In order to achieve the formation of polycarbonate using the method of the present invention an effective amount of catalyst must be employed. The amount of catalyst employed is typically based upon the total number of moles of dihydroxy compounds employed in the polymerization reaction. When referring to the ratio of catalyst, for example phosphonium salt VII, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of organic ammonium or phosphonium salts VI or VII employed typically will be in a range between about $1\times10^{-2}$ and about $1\times10^{-5}$, preferably between about $1\times10^{-3}$ and about $1\times10^{-4}$ moles per mole of the first and second dihydroxy compounds combined. The inorganic metal hydroxide catalyst typically will be used in an amount corresponding to between about $1\times10^{-4}$ and about $1\times10^{-8}$, preferably $1\times10^{-4}$ and about $1\times10^{-7}$ moles of metal hydroxide per mole of the first and second dihydroxy compounds combined.

In some instances, it may not be necessary to add catalyst to the equilibration system as some of the dihydroxy compounds may have impurities that have a catalytic effect. Examples are small amounts of alkali metal hydroxides often present as residuals from the process to manufacture a dihydroxy compounds. These alkali metal hydroxides are sometimes added to neutralize acidic species from the catalyst employed in the process to manufacture the dihydroxy compound. An example is the use of sodium or potassium hydroxide to neutralize acidic species from cationic ion exchange resin catalyst in a process to manufacture bisphenol A. Other stabilizers that may be present in bisphenol A and of which some may have a catalytic effect are disclosed in U.S. Pat. No. 5,091,591.

The Process:

The present invention provides a method of preparing a polycarbonate oligomer mixture comprising the steps of:

(a) providing an equilibration system comprising a vessel, a reaction mixture contained within the vessel; and means for mixing the reaction mixture contained within the vessel wherein the reaction mixture comprises, i. a melted activated diaryl carbonate composition, and ii. a catalyst present in sufficient amount to initiate an oligomerization reaction between a dihydroxy composition and the activated diaryl carbonate to form polycarbonate oligomers, (b) introducing a melted dihydroxy composition to the reaction mixture contained within the equilibration system, (c) maintaining the reaction mixture contained within the vessel at an oligomerization temperature, said oligomerization temperature being below the melting point of the dihydroxy composition, and sufficiently high to allow formation of a homogeneous melt within the vessel, and (d) continuously drawing off a product stream from the equilibration system, wherein the product stream comprises a polycarbonate oligomer mixture.

Several embodiments of the equilibration system and means for mixing the reaction mixture are contemplated. The term "vessel" means any type of tank, receptacle, reactor, bed, or combinations thereof. More generally, the term "vessel" as used in this application refers to the area wherein the dihydroxy composition and the activated diaryl carbonate composition react to form polycarbonate oligomers. The term "vessel" should not be construed to limit the scope of the claims to a specific type of device or to a specific number of devices. Thus non limiting examples of "vessels" are suitably, reactors, tanks, horizontal tubes, vertical tubes, tubes with and without internals, extruders, rotating disc type reactors (e.g. horizontal) and pools etc.

The "means for mixing" the reaction mixture within the equilibration system and vessel(s) is with agitation by propellers and/or recirculation lines. In a particularly preferred embodiment the means for mixing is accomplished with a recirculation line and with a propeller.

In a preferred embodiment the dihydroxy compound is melted before its introduction into the equilibration system. Care should be taken to prevent degradation of the dihydroxy compound, and the residence time of the dihydroxy compound at a high melting temperature should be limited. Degradation of the dihydroxy compound can result in a colored polymer. Thus it is preferred that the polycarbonate oligomer formed from the method of this invention have a YI of less than 10 and more preferably less than 5. In another embodiment it is desirable to have a YI of less than 2 and more preferably less than 1.5 and still more preferably less than 0.8.

A preferred apparatus suitable for melting a dihydroxy compound will have a relatively short residence time and a relatively low film temperature. This can be accomplished with a short residence time in a thin film turbulizing melter. With a relatively short residence time it is meant a time less than 70% of the residence time in the equilibration system, preferably less than 30%, most preferably less than 10%. Particularly for degradation sensitive dihydroxy compounds it is also preferred to have essentially plug flow through the melting apparatus with a limited amount of backmixing to prevent broad residence time distribution. Examples of suitable melting apparatus are: thin film turbulizing melters, jacketed tubular melters with internal agitation, for example rotating discs or paddles, jacketed agitated vessels, jacketed agitated vessels with a recirculation line with or without heat exchanger, jacketed screw conveyors, two phase shell and tube heat exchangers, extruders, two phase static mixers. In one embodiment the residence time of the dihydroxy compound at a temperature above the equilibrium temperature in the equilibration system will be significantly shorter than the residence time at equilibrium in the equilibration system. In yet another embodiment a preferred melter is a single rotor high speed variable intensity paddle mixer of which the Hosokawa Bepex Turbulizer Mixer/Coater is frequently preferred.

In another embodiment 2 or more dihydroxy compounds are preferably added as a melt to the equilibration system. They can be added as a mixture or in separate feeds. Preferred are combinations of dihydroxy compounds where one dihydroxy compound is bisphenol A.

In one embodiment the dihydroxy compounds are added as a melt to an equilibration system comprising a stirred vessel, optionally with a recirculation line. The melted dihydroxy can be added to the vessel in different ways (i.e. from the top of the vessel by free fall into the liquid reaction mixture, through a dip pipe into the liquid reaction mixture, by side feed above or below the surface of the liquid reaction mixture). Combinations of the foregoing embodiments are also possible.

The activated diaryl carbonate can also be added to the equilibration system in different ways. In one embodiment the activated diaryl carbonate is added as a melt to the equilibration system from a holding vessel where the activated diaryl carbonate is kept in a liquid state. It is also contemplated adding the diaryl carbonate as a solid or pre-melting the diaryl carbonate in a melting apparatus similar to that contemplated for the melting of the dihydroxy compounds is possible.

It is contemplated that the catalyst could be added together with or without the activated diaryl carbonate. Non limiting examples of addition modes are by direct injection into the line of a catalyst solution in a solvent, addition separately to the equilibration system, or addition with a dihydroxy compound.

The equilibration system is preferably operated in an inert state to prevent oxidation of the reaction mixture. Making the system inert is suitably carried out by blanketing the system with inert gas, for example nitrogen. As a person skilled in the art will appreciate that the required level of inertness (i.e. the maximum oxygen level allowed) will depend on the equilibration temperature and the sensitivity of the monomers employed to oxidation. In some embodiments it is preferred to have very low oxygen levels, preferably less than 1%, more preferably <1000 ppm, most preferably <100 ppm.

Following the introduction of the dihydroxy composition to the reaction mixture within the equilibration system, the dihydroxy compound(s) and the diaryl carbonate are allowed to react in the presence of the effective amount of catalyst to form polycarbonate oligomers. As used in the specification and claims of this application, the term "oligomers" refers to polycarbonate polymers having from 2 to 40 repeat units derived from the dihydroxy compound(s).

During the oligomerization reaction, the equilibrium vessel is maintained at a temperature below the melting point of the dihydroxy composition. This temperature is preferably between a temperature below 140° C. and 300° C. If the temperature is too high, then there is a risk of catalyst degradation and by-product formation. If the temperature is too low the monomer residues and the polycarbonate oligomers might crystallize. The melting point of the comonomers used in the invention are typically above that of the operating temperature of the equilibration vessel. Thus the mixture within the equilibration vessel has a lower freezing point than the individual comonomers. In one embodiment the temperature in the equilibration system will be maintained at a temperature at least 10° C. lower than the melting temperature of the highest melting dihydroxy compound. In another embodiment the temperature in the equilibration system will be at least 30° C. lower than the melting temperature of the highest melting dihydroxy compound. In yet another embodiment the temperature in the equilibration system will be at least 100° C. lower than the melting temperature of the highest melting dihydroxy compound. The addition of the dihydroxy compound(s) can be accomplished by continuous, pulsed, semi-continuous or semi-batchwise feeding.

High temperatures of the oligomer mixture will also increase undesired by product formation including salicyl OH (see U.S. Pat. No. 6,548,623 and structure below).

Thus it is an aspect of the present invention to maintain the temperature of the equilibration vessel in a range that discourages the formation of Salicyl OH and crystallization of the monomers.

During the reaction, the equilibration vessel is suitably maintained at atmospheric pressure, since this is both cost effective and avoids volatilization of the methyl salicylate that is acting as a solvent. It will be appreciated however, that higher or lower pressures could be employed if desirable, since the pressure in the equilibration system is not absolutely critical.

After an initial reaction period, a product stream of a polycarbonate oligomer is continuously drawn off from the equilibration vessel such that the equilibration vessel has a residence time suitable for reaction to form polycarbonate oligomers. An acceptable residence time of an equilibration vessel is from 5 min to 10 hours, and more preferably 30 minutes to 2 hours.

The polycarbonate oligomer mixture drawn from the equilibration vessel may suitably used as a feedstock for the generation of polycarbonate polymers of higher molecular weight (for example 18,000 $M_w$ to 150,000 $M_w$). In accordance with this aspect of the invention, polycarbonate oligomer made as described above is introduced to a polycondensation system where methyl salicylate is eliminated and a polymerization reaction continues to increase the molecular weight of the polycarbonate. The polycondensation system comprises reactors that can be operated under vacuum to eliminate the methyl salicylate and at higher temperature to avoid crystallization of the oligorners. Suitable reactors that may be used in the polycondensation system include inter alia continuously stirred tank reactors, extruders, plug flow reactors, tubular reactors, and flash tanks. Heating and evaporation is very fast to minimize residence time with high temperature and high methyl salicylate content in order to minimize by-product formation. Reaction completion and polymerization is usually accomplished in one or more reactors. The resulting polycarbonate polymers preferably have a molecular weight $M_w$ of greater than 18,000.

The present invention also provides a method for making a molded article and a molded article formed from polycarbonate comprising the steps of:
(i) preparing a polycarbonate oligomer mixture comprising the steps of:
    (a) providing an equilibration system comprising a vessel, a reaction mixture contained within the vessel, and means for mixing the reaction mixture contained within the vessel wherein the reaction mixture comprises,
        i. a melted activated diaryl carbonate composition, and
        ii. a catalyst present in sufficient amount to initiate an oligomerization reaction between a dihydroxy composition and the activated diaryl carbonate to form polycarbonate oligomers,
    (b) introducing a melted dihydroxy composition to the reaction mixture contained within the equilibration system,
    (c) maintaining the reaction mixture contained within the vessel at an oligomerization temperature, said oligomerization temperature being below the melting points of the dihydroxy composition, and sufficiently high to allow formation of a homogeneous melt within the vessel, and
    (d) continuously drawing off a product stream from the equilibration system, wherein the product stream comprises a polycarbonate oligomer mixture,
(ii) introducing the polycarbonate oligomer mixture from step (i) to a polycondensation system to build molecular weight, thereby producing polycarbonate, and
(iii) forming a molded article from the polycarbonate.

The molded articles may be molded from this polycarbonate by the processes of inter alia injection molding, blow molding, extrusion or coextrusion.

Figure 1:
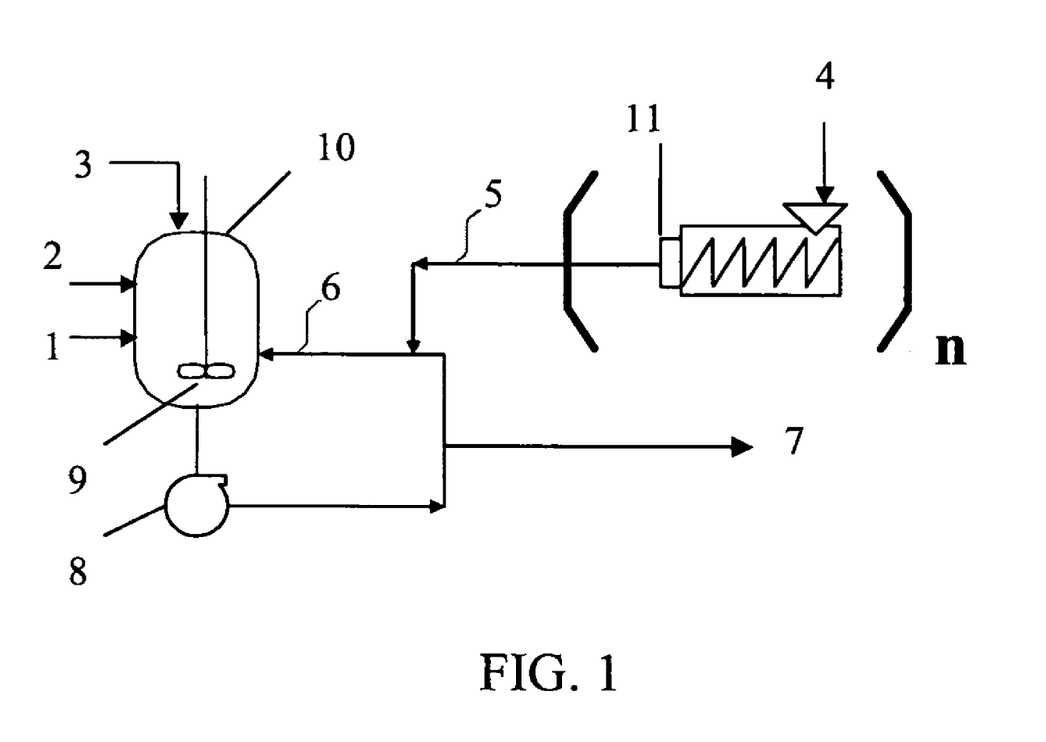
FIG. 1 shows an apparatus for practicing an embodiment of the invention.

FIG. 1 shows a schematic representation of an apparatus for practicing the invention. The dihydroxy compound(s) is fed to a melter 11 via hopper 4. The melted dihydroxy is then fed to the equilibration system, here vessel 10, via feed line 5. According to this embodiment the dihydroxy feed line 5 is combined with a recycle line 6 prior to its introduction to the equilibration vessel 10. The activated diaryl carbonate composition is introduced to the equilibration system via feed line 1. Catalysts may be introduced to the equilibration vessel 10 via catalyst feed 2. If required, methyl salicylate may be added to the equilibration vessel via methyl salicylate feed 3. A portion of the oligomer stream drawn from equilibration vessel 10 is then recycled back into the equilibration system via recycle feed 6 through pump 8. The oligomer product formed in the equilibration vessel 10 may be sent to a filter prior to a polycondensation system via oligomer product stream 7. The equilibration vessel 10 is equipped with a means for mixing the reaction mixture within the equilibration system which is a vertical rotating shaft with stirring blades 9.

An apparatus is also provided for making polycarbonate by the method of the present invention. The apparatus comprises; one or more melters containing either separately or in combination an activated diaryl carbonate composition and a dihydroxy composition; a equilibration vessel connected to the one or more melters and receiving melted diaryl carbonate composition and melted dihydroxy composition therefrom via one or more monomer feed lines; a feed line connected to the equilibration vessel and containing a polymerization catalyst; a polycondensation system, wherein the polycondensation system is connected at one end to the equilibration vessel; and a transfer line connecting the equilibration vessel to the polycondensation system and containing an oligomer stream; wherein the equilibration vessel has a size and the apparatus has a flow rate that are selected in combination such that the residence time of the diaryl carbonate composition and the dihydroxy composition in the equilibration vessel is sufficient to produce polycarbonate oligomers within the equilibration vessel.

The apparatus may further comprise a recirculation feed line extending from the transfer line to the equilibration vessel and containing a portion of the oligomer stream, whereby the portion of the oligomer stream is recirculated to the equilibration vessel. One or more monomer feed lines may be combined with the recirculation feed line to aid in mixing the monomer stream(s) as well as prevent crystallization of the monomers.

The temperature, flow rate, and the mixing rate of the melters as well as the melters themselves are selected so as to prevent substantial degradation of the dihydroxy and the activated diaryl carbonate. The one or more melters may be selected from the group consisting of, thin film melters, jacketed tubular melters with internal agitation, jacketed agitated vessels, jacketed agitated vessels with a recirculation line with or without heat exchanger, jacketed screw conveyors, two phase shell and tube heat exchangers, extruders, and two phase static mixers.

In yet another embodiment, the apparatus further comprises an equilibration system having 2 or more oligomer mixture vessels which intermittently feed the polycondensation system.

Blends of polymers are typical in industry. Thus the polycarbonate prepared using the method of the present invention may be blended with other polymeric materials, for example, other polycarbonates, polyestercarbonates, polyesters and olefin polymers such as ABS. Further, the polycarbonates prepared using the method of the present invention may be blended with conventional additives such as heat stabilizers, mold release agents, and UV stabilizers. These blends may be molded into various articles such as optical disks, optical lenses, automobile lamp components and the like. Thus, it is an aspect of the present invention to provide molded articles comprising the blends of polycarbonate and/or the polycarbonate produced by the method of the present invention.

The invention claimed is:

1. A method of preparing a polycarbonate oligomer mixture comprising the steps of:
   (a) providing an equilibration system comprising a vessel, a reaction mixture contained within the vessel, and means for mixing the reaction mixture contained within the vessel wherein the reaction mixture comprises,
      i. a melted activated diaryl carbonate composition, and
      ii. a catalyst present in sufficient amount to initiate an oligomerization reaction between a dihydroxy composition and the activated diaryl carbonate to form polycarbonate oligomers,
   (b) introducing a melted dihydroxy composition to the reaction mixture contained within the equilibration system,
   (c) maintaining the reaction mixture contained within the vessel at an oligomerization temperature, said oligomerization temperature being below the melting point of the dihydroxy composition, and sufficiently high to allow formation of a homogeneous melt within the vessel, and
   (d) continuously drawing off a product stream from the equilibration system, wherein the product stream comprises a polycarbonate oligomer mixture.

2. The method of claim 1, wherein the melted dihydroxy compound is provided from a melting apparatus, and wherein the dihydroxy compound has a total residence time in the melting apparatus and the equilibration system such that the polycarbonate oligomer mixture has a Yellowness Index (YI) of less than 10.

3. The method of claim 2, wherein the residence time in the melting apparatus is less than 30% of the residence time in the equilibration system.

4. The method of claim 2, wherein the melted dihydroxy compound is provided from a melting apparatus, and wherein the dihydroxy compound has a total residence time in the melting apparatus and the equilibration system such that the polycarbonate oligomer mixture has a Yellowness Index (YI) of less than 5.

5. The method of claim 2, wherein the melting apparatus comprises a thin film turbulizing melter.

6. The method of claim 1, wherein the reaction mixture is maintained at an oligomerization temperature of between 140° C. and 300° C.

7. The method of claim 1, wherein the dihydroxy composition comprises bisphenol A (BPA).

8. The method of claim 7, wherein the dihydroxy composition further comprises one or more additional dihydroxy compounds different from BPA.

9. The method of claim 1, wherein the dihydroxy composition consists essentially of BPA.

10. The method of claim 1, wherein the activated diaryl carbonate composition comprises bismethylsalicylcarbonate (BMSC).

11. The method of claim 10, wherein the activated diaryl carbonate composition further comprises one or more additional diaryl carbonate compounds different from BMSC.

12. The method of claim 10, wherein the dihydroxy composition comprises BPA.

13. The method of claim 1, wherein the activated diaryl carbonate composition consists essentially of BMSC.

14. The method of claim 1, wherein the dihydroxy composition is introduced to the reaction mixture in a melted state and is melted by means which prevent substantial degradation of the dihydroxy composition.

15. The method of claim 1, wherein the diaryl carbonate composition is melted by means which prevent substantial degradation of the diaryl carbonate.

16. The method of claim 1, wherein the equilibration system is operated at atmospheric pressure under a substantially oxygen-free atmosphere.

17. The method of claim 1, wherein the means for mixing the reaction mixture comprises a recirculation feed whereby a portion of the polycarbonate oligomer mixture is recirculated to the equilibration system.

18. The method of claim 17, wherein the recirculation feed flow rate is higher than the feed flow rate of dihydroxy composition.

19. The method of claim 17, wherein the dihydroxy composition is combined with the recirculation feed prior to introduction to the equilibration system.

20. The method of claim 1, wherein the dihydroxy composition and the diaryl carbonate composition are present in molar ratios of 0.25:1 to 3:1.

21. The method of claim 20, wherein the dihydroxy composition and the diaryl carbonate composition are present in molar ratios of 0.9:1 to 1.5:1.

22. The method of claim 1, wherein the reaction mixture is maintained at a temperature of 10° C. lower than the melting temperature of the highest melting dihydroxy compound.

23. The method of claim 22, wherein the reaction mixture is maintained at a temperature of 30° C. lower than the melting temperature of the highest melting dihydroxy compound.

24. The method of claim 23, wherein the reaction mixture is maintained at a temperature of 100° C. lower than the melting temperature of the highest melting dihydroxy compound.

25. A method for preparing polycarbonate, comprising the steps of:
(i) preparing a polycarbonate oligomer mixture comprising the steps of:
(a) providing an equilibration system comprising a vessel, a reaction mixture contained within the vessel, and means for mixing the reaction mixture contained within the vessel wherein the reaction mixture comprises,
i. a melted activated diaryl carbonate composition, and
ii. a catalyst present in sufficient amount to initiate an oligomerization reaction between a dihydroxy composition and the activated diaryl carbonate to form polycarbonate oligomers,
(b) introducing a melted dihydroxy composition to the reaction mixture contained within the equilibration system,
(c) maintaining the reaction mixture contained within the vessel at an oligomerization temperature, said oligomerization temperature being below the melting point of the dihydroxy composition, and sufficiently high to allow formation of a homogeneous melt within the vessel, and
(d) continuously drawing off a product stream from the equilibration system, wherein the product stream comprises a polycarbonate oligomer mixture, and
(ii) introducing the polycarbonate oligomer mixture from step (i) to a polycondensation system to build molecular weight, thereby producing polycarbonate.

26. The method of claim 25, wherein the melted dihydroxy compound is provided from a melting apparatus, and wherein the dihydroxy compound has a total residence time in the melting apparatus and the equilibration system such that the polycarbonate oligomer mixture has a Yellowness Index (YI) of less than 10.

27. The method of claim 26, wherein the residence time in the melting apparatus is less than 30% of the residence time in the equilibration system.

28. The method of claim 26, wherein the melted dihydroxy compound is provided from a melting apparatus, and wherein the dihydroxy compound has a total residence time in the melting apparatus and the equilibration system such that the polycarbonate oligomer mixture has a Yellowness Index (YI) of less than 5.

29. The method of claim 26, wherein the melting apparatus comprises a thin film turbulizing melter.

30. The method of claim 25, wherein the reaction mixture is maintained at an oligomerization temperature of between 140° C. and 300° C.

31. The method of claim 25, wherein the dihydroxy composition comprises BPA.

32. The method of claim 31, wherein the dihydroxy composition further comprises one or more the additional dihydroxy compounds different from BPA.

33. The method of claim 25, wherein the dihydroxy composition consists essentially of BPA.

34. The method of claim 25, wherein the activated diaryl carbonate composition comprises BMSC.

35. The method of claim 34, wherein the activated diaryl carbonate composition further comprises one or more additional activated diaryl carbonate compounds different from BMSC.

36. The method of claim 34, wherein the dihydroxy composition comprises BPA.

37. The method of claim 25, wherein the activated diaryl carbonate composition consists essentially of BMSC.

38. The method of claim 25, wherein the dihydroxy composition is melted by means which prevent substantial degradation of the dihydroxy composition.

39. The method of claim 25, wherein the activated diaryl carbonate composition is melted by means prevent substantial degradation of the activated diaryl carbonate.

40. The method of claim 25, wherein the equilibration system is operated at atmospheric pressure.

41. The method of claim 25, wherein the means for mixing the reaction mixture comprises a recirculation feed whereby a portion of the polycarbonate oligomer mixture is recirculated to the equilibration system.

42. The method of claim 41, wherein the recirculation feed flow rate is higher than the feed flow rate of dihydroxy composition.

43. The method of claim 41, wherein the dihydroxy composition is combined with the recirculation feed prior to introduction to the equilibration system.

44. The method of claim 25, wherein the dihydroxy composition and the activated diaryl carbonate composition are present in molar ratios of 0.25:1 to 3:1.

45. The method of claim 44, wherein the dihydroxy composition and the activated diaryl carbonate composition are present in molar ratios of 0.9:1 to 1.5:1.

46. The method of claim 25, further comprising the step of filtering the polycarbonate oligomer mixture prior to introducing it to the polycondensation system.

47. The method of claim 25, wherein the reaction mixture is maintained at a temperature of 10° C. lower than the melting temperature of the highest melting dihydroxy compound.

48. The method of claim 47, wherein the reaction mixture is maintained at a temperature of 30° C. lower than the melting temperature of the highest melting dihydroxy compound.

49. The method of claim 48, wherein the reaction mixture is maintained at a temperature of 100° C. lower than the melting temperature of the highest melting dihydroxy compound.

50. A molded article formed from polycarbonate produced by the method, comprising the steps of:
(i) preparing a polycarbonate oligomer mixture comprising the steps of:
(a) providing an equilibration system comprising a vessel, a reaction mixture contained within the vessel, and means for mixing the reaction mixture contained within the vessel wherein the reaction mixture comprises,
i. a melted activated diaryl carbonate composition, and
ii. a catalyst present in sufficient amount to initiate an oligomerization reaction between a dihydroxy composition and the activated diaryl carbonate to form polycarbonate oligomers,
(b) introducing a melted dihydroxy composition to the reaction mixture contained within the equilibration system,
(c) maintaining the reaction mixture contained within the vessel at an oligomerization temperature, said oligomerization temperature being below the melting points of the dihydroxy composition, and sufficiently high to allow formation of a homogeneous melt within the vessel, and
(d) continuously drawing off a product stream from the equilibration system, wherein the product stream comprises a polycarbonate oligomer mixture, and (ii) introducing the polycarbonate oligomer mixture from step (i) to a polycondensation system to build molecular weight, thereby producing polycarbonate, and
(iii) forming a molded article from the polycarbonate.

51. A method for making a molded article formed from polycarbonate produced by the method, comprising the steps of:
(i) preparing a polycarbonate oligomer mixture comprising the steps of:
  (a) providing an equilibration system comprising a vessel, a reaction mixture contained within the vessel, and means for mixing the reaction mixture contained within the vessel wherein the reaction mixture comprises,
    i. a melted activated diaryl carbonate composition, and
    ii. a catalyst present in sufficient amount to initiate an oligomerization reaction between a dihydroxy composition and the activated diaryl carbonate to form polycarbonate oligomers,
  (b) introducing a melted dihydroxy composition to the reaction mixture contained within the equilibration system,
  (c) maintaining the reaction mixture contained within the vessel at an oligomerization temperature, said oligomerization temperature being below the melting point of the dihydroxy composition, and sufficiently high to allow formation of a homogeneous melt within the vessel, and
  (d) continuously drawing off a product stream from the equilibration system, wherein the product stream comprises a polycarbonate oligomer mixture, and
(ii) introducing the polycarbonate oligomer mixture from step (a) to a polycondensation system to build molecular weight, thereby producing polycarbonate, and
(iii) forming a molded article from the polycarbonate.

52. An apparatus for making polycarbonate comprising:
(a) one or more melters containing either separately or in combination an activated diaryl carbonate composition and a dihydroxy composition;
(b) a equilibration vessel connected to the one or more melters and receiving melted activated diaryl carbonate composition and melted dihydroxy composition therefrom via one or more monomer feed lines;
(c) a feed line connected to the equilibration vessel and containing a polymerization catalyst;
(d) a polycondensation system, wherein the polycondensation system is connected at one end to the equilibration vessel; and
(e) a transfer line connecting the equilibration vessel to the polycondensation system and containing an oligomer stream;
wherein the equilibration vessel has a size and the apparatus has a flow rate that are selected in combination such that the residence time of the activated diaryl carbonate composition and the dihydroxy composition in the equilibration vessel is sufficient to produce polycarbonate oligomers within the equilibration vessel.

53. The apparatus of claim 52, wherein the activated diaryl carbonate composition comprises BMSC.

54. The apparatus of claim 53, wherein the activated diaryl carbonate composition further comprises one or more additional activated diaryl carbonate compositions different from BMSC.

55. The apparatus of claim 52, wherein the activated diaryl carbonate composition consists essentially of BMSC.

56. The apparatus of claim 52, wherein the one or more melters are selected such that substantial degradation of the dihydroxy composition does not occur in the one or more melters.

57. The apparatus of claim 52, wherein the one or more melters are selected such that substantial degradation of the activated diaryl carbonate composition does not occur in the one or more melters.

58. The apparatus of claim 52, further comprising a recirculation feed line extending from the transfer line to the equilibration vessel and containing a portion of the oligomer stream, whereby a portion of the oligomer stream is recirculated to the equilibration vessel.

59. The apparatus of claim 58, wherein the one or more monomer feed lines are combined with the recirculation feed line.

60. The apparatus of claim 52, wherein the one or more melters are selected from the group consisting of thin film melters, jacketed tubular melters with internal agitation, jacketed agitated vessels, jacketed agitated vessels with a recirculation line with or without heat exchanger, jacketed screw conveyors, two phase shell and tube heat exchangers, extruders, and two phase static mixers.

61. A method of preparing a polycarbonate oligomer mixture comprising the steps of:
(a) providing an equilibration system comprising a vessel, a reaction mixture contained within the vessel, and means for mixing the reaction mixture contained within the vessel wherein the reaction mixture comprises,
  i. a melted activated diaryl carbonate composition, and
  ii. a catalyst present in sufficient amount to initiate an oligomerization reaction between a dihydroxy composition and the activated diaryl carbonate to form polycarbonate oligomers,
(b) introducing a melted dihydroxy composition to the reaction mixture contained within the equilibration system, wherein the dihydroxy composition is selected from the group consisting of 2,6-dihydroxy naphthalene; 2,6-dihydroxy-3-methyl naphthalene; and 2,6-dihydroxy-3-phenyl naphthalene, and
(c) continuously drawing off a product stream from the equilibration system, wherein the product stream comprises a polycarbonate oligomer mixture, wherein the melted dihydroxy compound is provided from a melting apparatus, and wherein the dihydroxy compound has a total residence time in the melting apparatus and the equilibration system such that the polycarbonate oligomer mixture has a Yellowness Index (YI) of less than 10.

* * * * *